United States Patent [19]
Hanson et al.

[11] 3,725,386
[45] Apr. 3, 1973

[54] METHOD FOR PURIFYING CRUDE, DRY GRANULAR REACTED COLD WATER SWELLING HYDROXYPROPYL STARCH DERIVATIVES

[75] Inventors: Cleo E. Hanson; John V. Tuschhoff, both of Decatur, Ill.

[73] Assignee: A. E. Staley Manufacturing Company, Decatur, Ill.

[22] Filed: Dec. 6, 1971

[21] Appl. No.: 205,299

Related U.S. Application Data

[63] Continuation-in-part of Ser. No. 32,341, April 27, 1970, abandoned, which is a continuation-in-part of Ser. No. 696,149, Jan. 8, 1968, abandoned.

[52] U.S. Cl. ....260/233.3 R, 260/233.3 A, 260/233.5
[51] Int. Cl. .............................................C08b 19/06
[58] Field of Search.....................260/233.3 A, 233.5

[56] References Cited
UNITED STATES PATENTS 2,845,417  7/1958  Kesler et al.......................260/233.3

*Primary Examiner*—Donald E. Czaja
*Assistant Examiner*—Melvyn I. Marquis
*Attorney*—Howard J. Barnett

[57] ABSTRACT

A method of purifying crude, cold water swelling hydroxypropylated starch derivatives prepared by reacting propylene oxide directly with granular starch in the presence of a polybasic, water soluble salt of phosphoric acid catalyst, and in the absence of any liquid reaction medium by washing the crude reacted product with a water-alcohol mixture, the water being present in the water-alcohol mixture in a weight ratio of between 0.1 to 0.7 parts per part of alcohol. The method removes the overreacted-highly substituted starch fractions which are not approved for food use, and other by-products which would otherwise limit the use of the crude product in food.

5 Claims, No Drawings

METHOD FOR PURIFYING CRUDE, DRY GRANULAR REACTED COLD WATER SWELLING HYDROXYPROPYL STARCH DERIVATIVES

BACKGROUND OF THE INVENTION

This application is a continuation-in-part of application Ser. No. 32,341 filed Apr. 27, 1970, which is a continuation-in-part of application Ser. No. 696,149 filed Jan. 8, 1968, both now abandoned.

This invention is directed to a method for purifying dry granular reacted hydroxypropyl starch derivatives and in particular, to a method for purifying crude cold water-soluble hydroxypropyl starch derivatives resulting from the dry granular reaction of propylene oxide with starch in the presence of a polybasic, water soluble salt of phosphoric acid.

Although gelatinized and ungelatinized hydroxyalkyl starches, and particularly hydroxypropyl starches, have been available for a number of years, it has been only recently that such ungelatinized cold water soluble hydroxyalkyl starches have been recognized as a good additive by the food industry. The ungelatinized products provide considerable flexibility in handling, and modes of use in various food preparation procedures.

Ungelatinized hydroxypropyl starches have been produced by methods such as that disclosed in U. S. Pat. No. 2,516,634, in which propylene oxide is reacted with a granular starch material in the presence of sodium chloride and an alkali catalyst such as sodium hydroxide. Unfortunately, the above methods produce several by-products which remain in the final product, making it unacceptable for food use. Among these by-products are highly substituted starch fractions, which are not approved by the Food and Drug Regulations for food use. In addition, water soluble organic by-products such as propylene glycols derived from the reactant propylene oxide are present. Approximately 20 percent to 25 percent of the propylene oxide made available for reaction with the starch material is retained in the crude hydroxypropyl starch products as highly substituted starch fractions, propylene glycols, and other polymeric material, such as propylene oxide condensation products.

The crude starch product of this dry granular reaction contains about 10 percent to 15 percent by weight of a highly substituted starch fraction as compared to the remainder of the product. The crude hydroxypropyl starch product is therefore unsuitable for use in food applications because it has not been approved by FDA, and this fraction may cause processing difficulties and lead to an unsatisfactory final food product. The highly substituted fraction tends to absorb water much more rapidly than the less highly substituted portion of the starch product. Rapid absorption of water creates storage problems, and also causes "lumping" when the starch reaction product is dispersed in water. A smooth starch paste is an important requirement in most food applications, but is difficult to obtain with the crude hydroxypropyl starch product resulting from the dry granular reaction product of starch and propylene oxide, largely due to the presence of the overreacted, highly substituted starch fraction.

Cold water soluble hydroxyalkyl starch products have also been produced using alcohol-water mixtures as the liquid reaction medium for reacting a granular starch material with a halohydrin, namely ethylene chlorohydrin, or an alkylene oxide, namely ethylene oxide, as described in U. S. Pat. No. 2,845,417. All of the examples of this patent are limited to ethylene based reagents.

Although the starch products that result from reacting starch with ethylene oxide or ethylene halohydrin in an alcohol-water reaction medium are uniformly substituted with hydroxyethyl groups, the method of reaction requires careful controls and careful handling by the operators when performed on a large scale, because the ethylene oxide and the alcohol are both hazardous reagents to handle. After the reaction is completed, the alcohol water reaction medium must be removed. Care must be taken to avoid high drying temperatures, because the remaining alcohol can ignite quite easily. Any such drier fire is a first class emergency in a starch processing plant because of the omnipresent danger of explosions. The advantages related to the relatively pure product obtained from a water-alcohol slurry reaction using ethylene oxide are therefore counterbalanced to some extent by the hazards due to storing the ethylene oxide that must be kept available at the starch producing facilities. Propylene oxide is less hazardous to store and to handle in starch mills.

Although a uniformly substituted product may be obtained by the alcohol-water reaction described in U. S. Pat. No. 2,845,417, applicants found that the excess sodium chloride and sodium hydroxide are difficult to remove with alcohol-water wash, or any known practical method, and applicants have found that these salts impart an undesirable odor and taste to the product. In addition, sodium hydroxide may cause a highly colored product where this is not desired for food product appearance. Similar results are obtained with the other sulfate and chloride salts disclosed by Kesler.

Applicants discovered that phosphate salt catalysts do not impart an off-taste to their starch product, even when traces of the catalyst remain in the finished product after washing using the purification method of the invention.

U. S. Pat. No. 2,516,634 describes a dry granular reaction of starch with alkylene oxides, but in each example, sodium chloride is used as a catalyst. Example 4, in which propylene oxide is used, includes both sodium chloride and sodium hydroxide to catalyze the reaction of propylene oxide with starch. Although Kesler indicates that he uses the hydroxyethyl starch made according to his Example 1 procedure, there is no disclosure of any food use for his crude hydroxypropyl starch product resulting from Example 4. Applicants have found that it is extremely difficult and impractical to remove the off-taste and odors from hydroxypropyl starch made according to the method of Example 4.

Applicants could not use either the method of U. S. Pat. No. 2,516,634 or the method of U. S. Pat. No. 2,845,417 because of the salt taste problem, and it was not known what the results would be using only the phosphate salt catalysts in a dry granular reaction. Phosphate salt catalyst in an alcohol slurry reaction does not become sufficiently alkaline to "drive" the reaction to completion because phosphate salts are well-known buffers in liquid systems.

Hydroxypropylation was then tried, using only phosphate salt catalyst in a dry granular reaction, and the reaction went surprisingly well. However, the crude product of this reaction was found to have a large percentage of highly substituted starch, which would not be food acceptable, plus other by-products including dimers and trimers of propylene glycol which had to be first removed to obtain a food-acceptable product.

Various methods for purifying the crude product were tried without success, including water-washing, aerating, and vacuum drying. The resulting product was either still food unacceptable, or in the case of water washing, the entire starch product dissolved and the yield was too low to be commercially practical.

Using a water wash causes the starch product to lose its granular form, leading to expensive and difficult procedures for recovering the gelatinized product, which would also include the highly substituted starch fractions.

Various alcohols alone were also tried in an attempt to remove the contaminants from the starch product to make it food acceptable, but it was found that the use of alcohols alone is generally unsatisfactory, because they fail to remove enough of the contaminants from the starch material to make it satisfactory for food use.

After considerable effort and experimentation, applicants discovered that a food acceptable product could be made from the crude hydroxypropyl starch product using the purification process described in more detail below.

It was found that this process removes substantially all of the undesirable odors and flavors from the crude cold water soluble hydroxypropyl starch without modifying the granular structure, and that the resulting purified product is substantially free of highly substituted starch fractions which, as yet, are not approved for food use.

The uniformly substituted hydroxypropyl starch obtained by this invention from crude hydroxypropyl starch products has good taste, is free of objectionable odors, and has excellent appearance. The phosphate salt residues remaining in the product are food acceptable and may contribute to improved taste.

Following the method of this invention, crude hydroxypropyl granular starch derivatives resulting from the dry reaction of propylene oxide and starch in the presence of a phosphate salt catalyst can be freed of contaminants, such as highly substituted starch derivatives, which could otherwise prevent the product from being food acceptable under existing FDA regulations.

The purification is accomplished by contacting the crude granular hydroxypropyl starch product with a water-alcohol mixture having a water to alcohol weight ratio of between about 0.1:1 to 0.7:1. It has been found that when the crude granular hydroxypropyl starch is at least about 98 percent cold water soluble, the water-alcohol mixture should then have a water-to-alcohol weight ratio of between 0.1:1 and 0.5:1. If the amount of water in the water-alcohol mixture is substantially above the 0.5:1 ratio, substantial swelling of the granular hydroxypropyl starch is likely to occur with loss of the granular structure thereof. However, if the amount of water present in the water-alcohol mixture is substantially below the 0.1:1 ratio, only small amounts of the undesirable odors, flavors and other contaminants are removed from the crude starch material.

Applicants unexpectedly discovered that a wash solution of 85 to 90 percent by weight alcohol, in an 0.18:1 to about 0.11:1 water-alcohol ratio will not only remove the highly substituted starch fraction from the purified starch product but will also remove substantially all of the other dimers and trimers of propylene glycol and other contaminants, so that the purified starch product is substantially free of undesirable odors and flavors, and is food acceptable.

Ethanol is the preferred alcohol used in the process of the invention because it is most easily removed and is most efficient in removing the by-products from the crude starch product, especially when the purified starch product is to be used in food. Other monohydric alcohols such as methanol, propanol, isopropanol, butanol, isobutanol, the pentanols, hexanols can be used, but are not as easily removed, or are not as effective as ethanol in removing the by-products.

The amount of water-alcohol mixture needed to effectively purify crude hydroxyalkyl starches is not particularly critical, and can be varied over a relatively broad range. However, excellent results have been obtained when from 1.0 to 2.0 parts by weight of solvent is used per part of crude starch material. In most cases though, good results have been obtained when as high as 10.0 parts by weight of solvent per part of starch are used. For economical reasons the lower range of concentrations are generally preferred.

The order for combining the crude granular hydroxypropyl starch material with the water-alcohol mixture is likewise not particularly critical. In most cases, the starch material is added to the water-alcohol mixture. The order of addition may be reversed, if desired. After the starch material and the purifying solvent have been combined, the combination is preferably stirred or agitated to insure a continuous suspension of the starch granules in the water-alcohol mixture. This allows for maximum surface contact of the crude starch material with the purifying solvent, and tends to make the purification more efficient.

The efficiency of the purification can be further improved by contacting the crude starch material with a water-alcohol mixture maintained at a slightly elevated temperature. However, care must be taken to avoid temperatures which would cause substantial loss of the solvent, or which would destroy the ungelatinized form of the starch material. Although temperatures of between 35° and 150°F. are in most instances satisfactory, elevated temperatures of between 80° and 120°F. are generally preferred. The preferred temperature range is particularly useful when a cold water soluble hydroxypropyl starch is being washed with a water-ethanol mixture.

Effective purification of the crude hydroxypropyl starch is achieved when the water-alcohol mixture is adjusted and maintained at a pH of 7 or below, preferably at a pH of between about 3.5–7.0. If the water-alcohol wash is maintained at a pH of more than 7, there is a good possibility that the granular characteristics of the starch material will be destroyed. If the pH of the water-alcohol mixture is substantially below 3.5, hydrolysis of the starch material can occur.

The hydroxypropyl starches capable of being purified by the process of this invention are defined broadly as those produced with no liquid reaction medium, and having a hydroxypropyl degree of substitution sufficient to produce a starch derivative which is at least 50 percent cold water soluble. In other words, at least 50 percent of the derivatized starch is soluble in water at ambient temperatures, and at least 50 percent of the derivatized starch material will lose its granular characteristics. A starch material is considered to be granular when, under a polarizing microscope, the starch granules show a dark-cross pattern. However, as the starch is solubilized the observed crosses become less distinct and finally disappear altogether. In most cases, the derivatized starch material will be cold water soluble when it contains between about 5–15 percent by weight hydroxypropyl groups.

As noted previously, the hydroxypropyl starches which are purified by the process of this invention are starch materials which are obtained by the dry reaction of propylene oxide with starch in the presence of a phosphate salt catalyst at temperature of about 75°F. up to about 200°F. and preferably at temperatures of between 100° and 150°F. The presently preferred catalyst is a disodium salt of phosphate, which surprisingly, will react with propylene oxide in the presence of moisture contained in the starch granule to liberate sufficient free hydroxyl ions to make the reaction proceed, and which apparently does not form any undesirable, off-taste residues in the starch product. The starch granules are usually treated with the phosphate salt prior to being reacted with propylene oxide. Applicants have found that the dry granular process can be employed for reacting up to 25 percent propylene oxide with starch material. For purposes of this invention, a crude hydroxypropyl starch product prepared by a dry reaction procedure is a product prepared in the absence of a liquid phase other than the reactant propylene oxide and the moisture normally included in the starch granule, which is in the range of 5–15 percent by weight of the original starch material. Under these conditions, the starch is dry in the visual and tactile sense.

Any crude hydroxypropylated starch material including those incorporating starches derived from corn, wheat, tapioca, sago, rice, sorghum, waxy maize, and high amylose corn, can be purified by the process of the invention with proper adjustment of the water-alcohol mixture ratio. Hydroxypropylated starches derived from starch fractions such as amylose and amylopectin as well as certain modified starches such as acid-thinned, oxidized, dextrinized, acid-thinned hydroxypropylated starches, cationic starches, and epichlorohydrin cross-linked hydroxypropylated starches, can also be purified by the process of this invention. Normally, these granular starches include about 5 to 15 percent by weight of moisture prior to the hydroxypropylation process.

The following specific examples illustrate specific embodiments of the invention in more detail, and will more fully illustrate the presently contemplated mode for carrying out the invention.

EXAMPLE 1

To a 5,000 ml. three-necked round-bottom flask, 500 grams of a crude, cold water soluble granular hydroxypropyl starch was obtained by directly reacting granular starch with propylene oxide without any liquid reaction medium and using a phosphate salt catalyst. This crude product was suspended in 750 ml. of a water-alcohol mixture having a weight ratio of water to alcohol of 0.3:1. The round-bottom flask was equipped with a mechanical stirrer having a glass shaft fitted with a Teflon paddle. The water-alcohol-starch suspension was adjusted to a pH of between 5.5–6.5 and heated to a temperature of 100°F. After the suspension had been stirred for about 30 minutes, the granular starch was separated from the water-alcohol mixture by filtration and examined. It was found that the washed product had good flavor and relatively low (5–7) Gardner color (based on a Gardner white-plate secondary standard).

An analysis of the purified filtrate further showed that the purification process of this invention was capable of removing from the granular cold water soluble hydroxypropyl starch essentially all (98–100 percent) of those materials which were responsible for the bad taste in the starch material. This filtrate also contained highly substituted hydroxypropyl starch. The granular starch remaining was more uniformly substituted than was the crude hydroxypropyl starch starting material.

EXAMPLE 2–7

These examples show that the ratio of water to alcohol is extremely important if substantially all of the interfering materials are to be removed while at the same time retaining the granular form of the hydroxypropyl starch materials.

With the exception of varying the water-to-alcohol ratio, the procedure described in Example 1 was followed. The results obtained are reported in Table 1 below.

TABLE 1

| Examples | Weight Ratio Water-Alcohol | %Purification Efficiency* | Starch Form | Flavor** of Starch |
|---|---|---|---|---|
| 2 | 1:1 | | Swollen | Poor |
| 3 | 0.7:1 | 87.0 | Starting to swell | Satisfactory |
| 4 | 0.5:1 | 93.0 | Granular | Good |
| 5 | 0.3:1 | 99.0 | Granular | Good |
| 6 | 0.1:1 | 83.0 | Granular | Satisfactory |
| 7 | 0.05:1 | 10.0 | Granular | Poor |

\* %Purification Efficiency is a measure of the amount of contaminants, particularly dimers and trimers of propylene glycol, and other by-products in the crude hydroxypropyl starch which were removed by water-alcohol washing.

\*\* The flavor of the starch was determined by a panel of five experienced judges using standard testing procedures.

EXAMPLES 8–12

These examples show what effect temperature has on the purification process of this invention. Except for the temperature differences reported in Table II, the procedure described in Example 1 was followed.

TABLE II

| Examples | Temperature of Water-Alcohol Mixture °F. | %Purification Efficiency | Gardner* Color | Flavor |
|---|---|---|---|---|
| 8 | 50 | 91.0 | 7.2 | Satisfactory |
| 9 | 75 | 95.0 | 6.7 | Good |
| 10 | 100 | 99.0 | 6.0 | Good |
| 11 | 125 | 97.0 | 6.5 | Good |

| Example | | | | | |
|---|---|---|---|---|---|
| 12 | | 150 | | 93.0 | 7.5 Satisfactory |

*The color values were obtained on a Gardner Automatic Photometric Unit using a White Plate Secondary Standard supplied by Gardner Instruments, Inc.

It can be seen from the above that, although the temperature of the water-alcohol mixture has relatively little effect on the efficiency of the purification, the higher temperatures apparently do have an effect on the Gardner color.

EXAMPLES 13–15

These examples show that the hydroxypropyl starches can be purified with various monohydric alcohols. Except as noted in Table III, the conditions of purification are the same as those used in Example 1.

TABLE III

| Example | Alcohol | Weight ratio Water/alcohol | Temperature, °F. | Gardner Color | %Purification Efficiency |
|---|---|---|---|---|---|
| 13 | Methyl | 0.3:1 | 125 | 6.7 | 99.0 |
| 14 | Ethyl | 0.3:1 | 125 | 6.5 | 99.0 |
| 15 | Isopropyl | 0.3:1 | 125 | 7.0 | 97.0 |

EXAMPLES 16–18

These examples show one difference in hydroxyalkyl starch products produced by reaction between propylene oxide and starch (1) in the absence of liquid reaction medium, and (2) in an alcohol-water liquid reaction medium.

A hydroxypropyl corn starch produced with no liquid reaction medium, having a hydroxypropyl degree of substitution (D.S.) of 0.28 (i.e., 0.28 hydroxypropyl groups per anhydroglucose units of starch), was prepared as follows. 100 parts by weight (dry substance) unmodified corn starch, was treated with an aqueous solution of $Na_2HPO_4$ so that the resulting "dry" granular product which contained about 10 percent moisture included 1 part $Na_2HPO_4$. This phosphate treated starch was placed in a closed reactor, and heated to 175°F. Propylene oxide was then added to the reactor and allowed to react with the "dry" granular starch. Approximately 20 parts of propylene oxide was required to produce a hydroxypropyl starch with a D.S. of 0.28. 20 grams of this crude starch product was dispersed in 980 grams of distilled water which had been precooled to 50°F. The pH of the dispersion was adjusted from 10 to 6.5–7.0 by the addition of hydrochloric acid. After stirring the dispersion for one hour, it was centrifuged to remove liquid from solid. The remaining solid was re-subjected to dispersion in water as outlined above. This dispersion-separation cycle was carried out a total of three times. The separated liquids were evaporated to recover the starch that had remained in the liquid during processing. The hydroxypropyl content of the crude starch and each of the starch fractions was determined by a pyrolysis-gas chromatography method. The original hydroxypropyl starch was not uniformly substituted since 11.6 percent of this product had an average hydroxypropyl D.S. of 1.02 while the remaining 88.4 percent had an average D.S. of only 0.18.

A second sample of 200 grams of the same hydroxypropyl corn starch used above was thoroughly washed with a total of 500 ml. of a 0.25:1 weight ratio water-ethanol mixture at a temperature ranging from 80° to 100°F., and a pH of about 6.0. The washed hydroxypropyl corn starch residue was subjected to dispersion-separation as detailed above, except that the dispersions were stirred for six hours rather than one hour. Analyses of hydroxypropyl content of each of the resulting fractions indicated that the water-alcohol washed product was much more uniformly substituted relative to the crude hydroxypropyl corn starch product. The hydroxypropyl D.S. range of the water-alcohol washed product was only 0.22 to 0.16, with the average D.S. being 0.17. These results show that the alcohol-water wash removes substantially all of the highly substituted fraction, leaving a uniformly substituted hydroxyalkyl starch.

Finally, approximately 205 grams of a hydroxypropyl corn starch was prepared by reacting 50 grams of propylene oxide with 400 grams (dry substance) of corn starch in an ethyl alcohol-water reaction medium using the method of U. S. Pat. No. 2,845,417. This product was washed with 350 ml. of water-ethyl alcohol (0.14:1 by weight, water to ethyl alcohol). The reaction medium and wash liquid were combined and tested, by optical rotation methods, for the presence of starch. No starch was found in the liquid, indicating that the hydroxypropylated starch product produced in the water-alcohol reaction medium contained no highly substituted fraction i.e., a starch fraction so highly substituted that it is soluble in aqueous alcohol. However, these products still retained a somewhat bitter taste, due to residues of sodium chloride and sodium hydroxide. Similar experiments with water to alcohol ratios of greater than 0.14:1 have been performed and no starch was found in the wash liquid. It is clear from these comparisons that a hydroxypropylated starch product produced in a water-alcohol system includes no highly substituted fraction, and that it is difficult to remove all chloride salt residues from the crude product to obtain a food acceptable product.

We claim:

1. A process for purifying the crude cold water soluble hydroxyalkyl starch product produced by reacting propylene oxide in the presence of phosphate salt catalyst with no liquid reaction medium at a temperature above about 75°F., whereby said crude granular starch product is contaminated with highly substituted starch, and dimers and trimers of propylene glycol derived from propylene oxide, said process comprising washing said crude granular starch product with a mixture of water and alcohol at a temperature within the range of from 35° to 150°F. for a time sufficient to remove substantially all highly substituted starch and dimers and trimers of propylene glycol, and undesirable odors and flavors from said crude starch product, said mixture of water and alcohol having a water-to-alcohol weight ratio of between about 0.1:1 to about 0.7:1 and being maintained at a pH within the range of from about 3.5 to 7.0; and thereafter separating a purified, ungelatinized granular hydroxypropyl starch product having a lower degree of substitution from said mixture of water and alcohol.

2. The process of claim 1, in which the water-to-alcohol weight ratio is between about 0.2:1 and 0.5:1.

3. The process of claim 2, in which the alcohol is ethyl alcohol.

4. The process of claim 3, in which the highly substituted starch starch fraction removed has an average degree of substitution above about 0.18.

5. A process for making a hydroxypropyl food starch derivative, the steps comprising, disposing a dry granular starch having a moisture content from about 5–15 percent based on the dry weight of the starch in a sealable reactor vessel, adding a phosphate salt to the starch in a quantity effective to catalyze the reaction of the starch with propylene oxide, sealing the reactor, introducing up to about 25 percent by weight of propylene oxide based on the dry weight of the starch while agitating the reaction mixture and while maintaining the temperature in a range from about 75°F. up to a temperature below the decomposition temperature of the starch granules to obtain a crude, granular hydroxypropyl starch product containing a mixture of a first portion of highly substituted, alcohol-water soluble hydroxypropyl starch having a relatively lower degree of substitution, and a mixture of reaction byproducts including dimers and trimers of propylene glycol, removing said crude product from said reactor, and washing said crude granular starch product with a mixture of alcohol and water at a temperature in the range of from 35° to 150°F. for a time sufficient to dissolve substantially all of said first portion of alcohol-water soluble starch and said mixture of reaction by-products, said alcohol-water mixture having an alcohol-to-water weight ratio of between about 0.1:1 to about 0.7:1, and separating said alcohol-water mixture containing said first portion of starch and said reaction by-products from the second portion of hydroxypropyl starch to obtain a purified, food acceptable cold water swelling, granular hydroxypropyl starch.

\* \* \* \* \*